Figure 20:
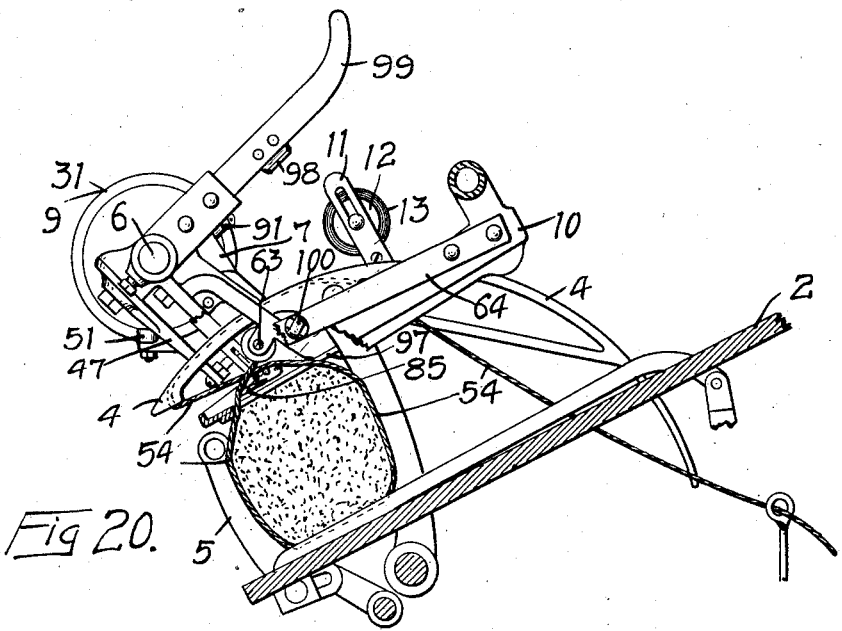

J. L. WARE.
BINDER HEAD FOR HARVESTERS.
APPLICATION FILED MAY 1, 1909.
1,039,853.
Patented Oct. 1, 1912.
5 SHEETS—SHEET 1.
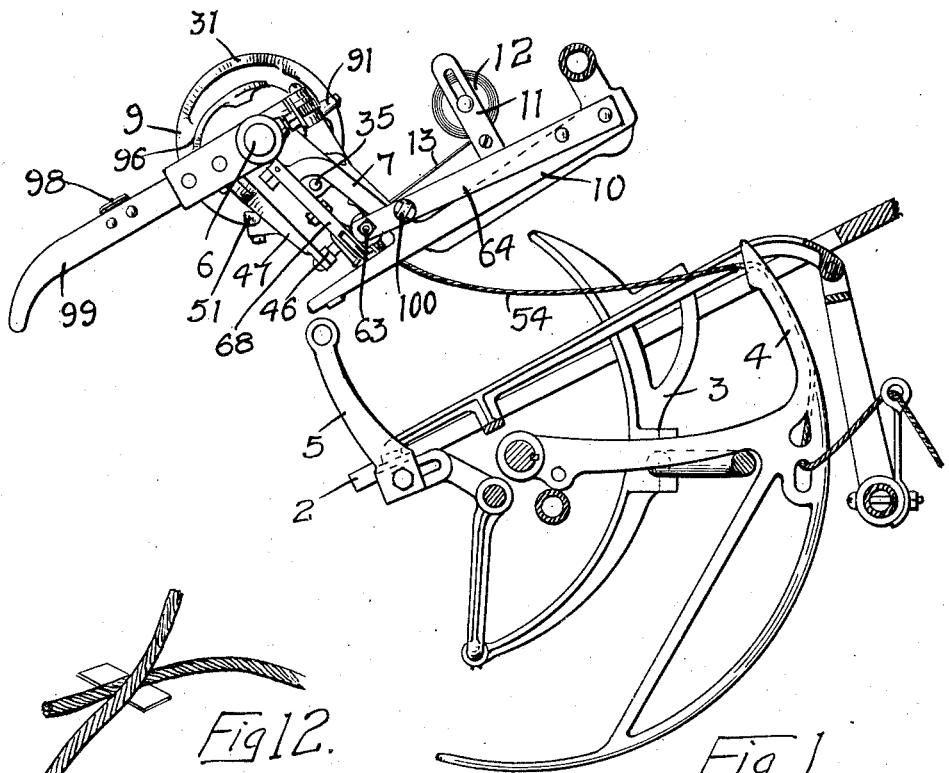
Fig 1.
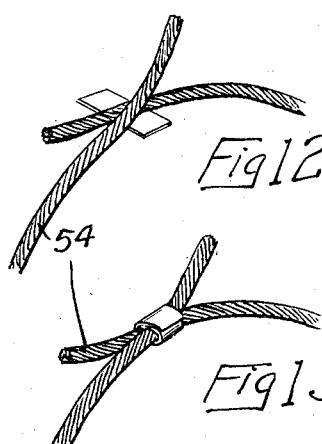
Fig 12.
Fig 13.
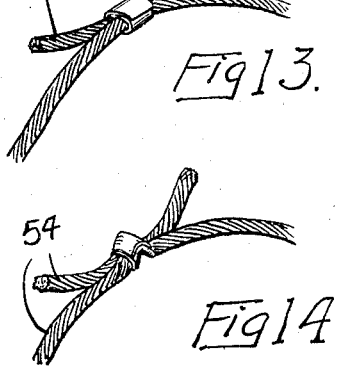
Fig 14.
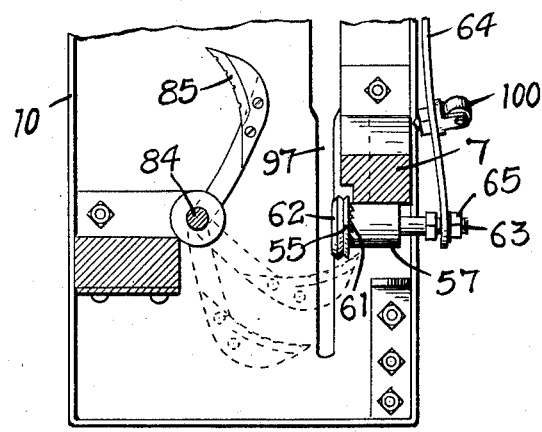
Fig 22.
WITNESSES
M. Walters
J. M. Sullivan
INVENTOR
JOSEPH L. WARE
BY Paul & Paul
HIS ATTORNEYS

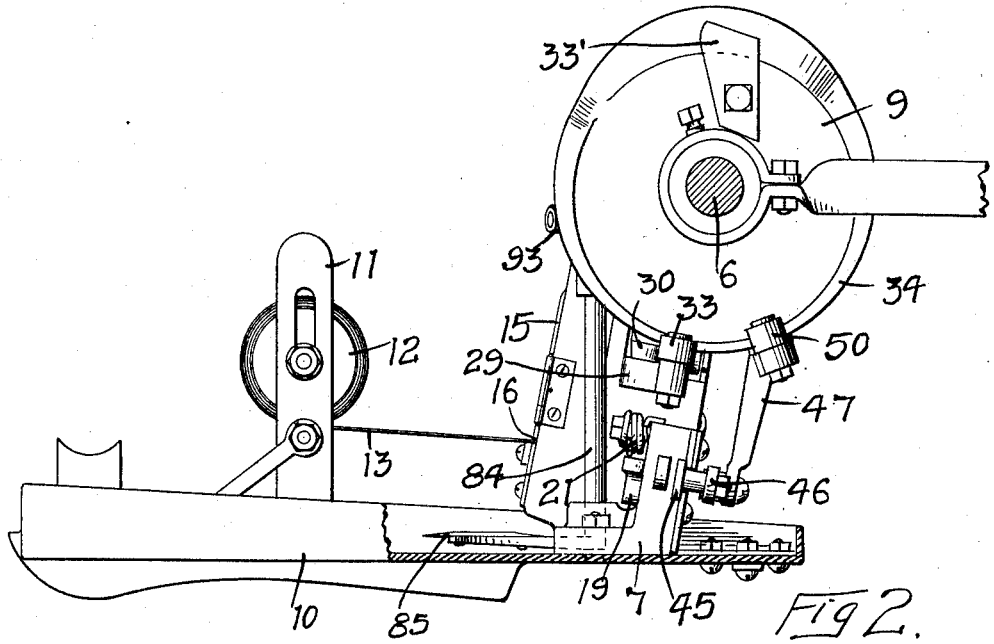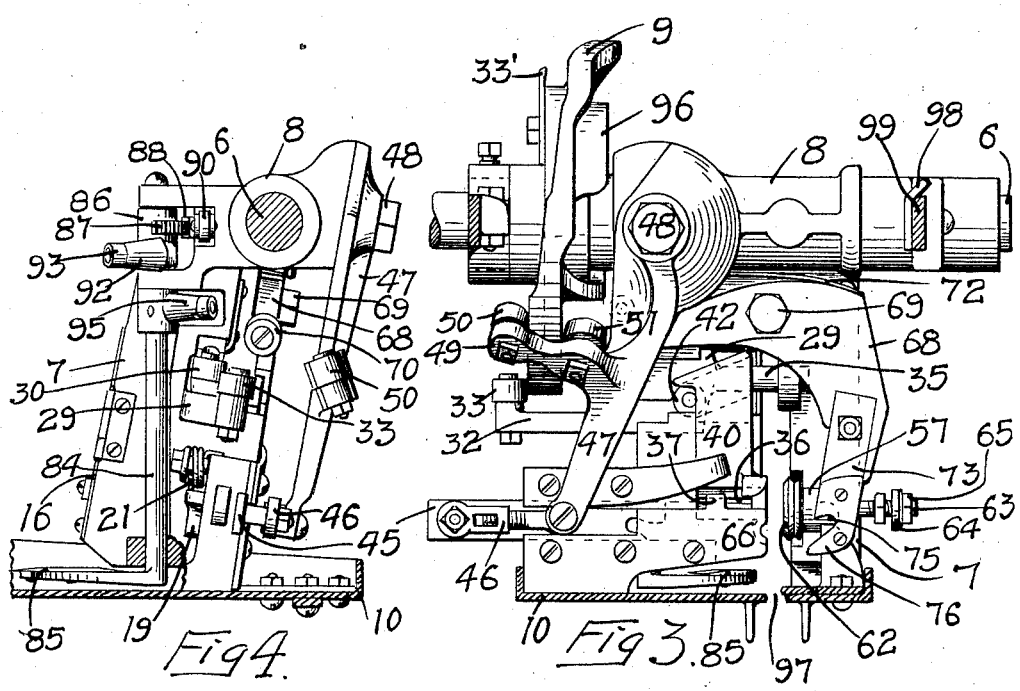

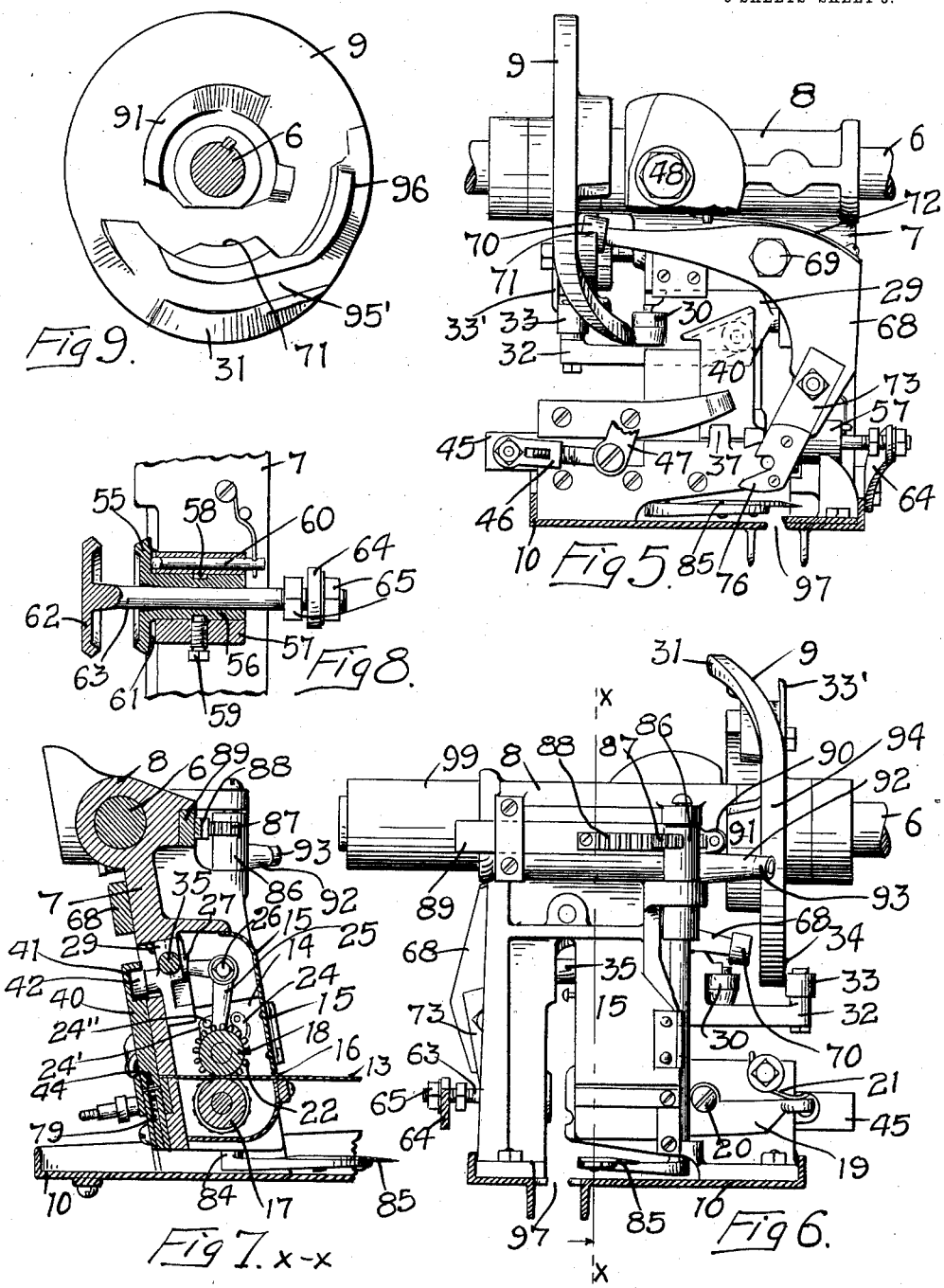

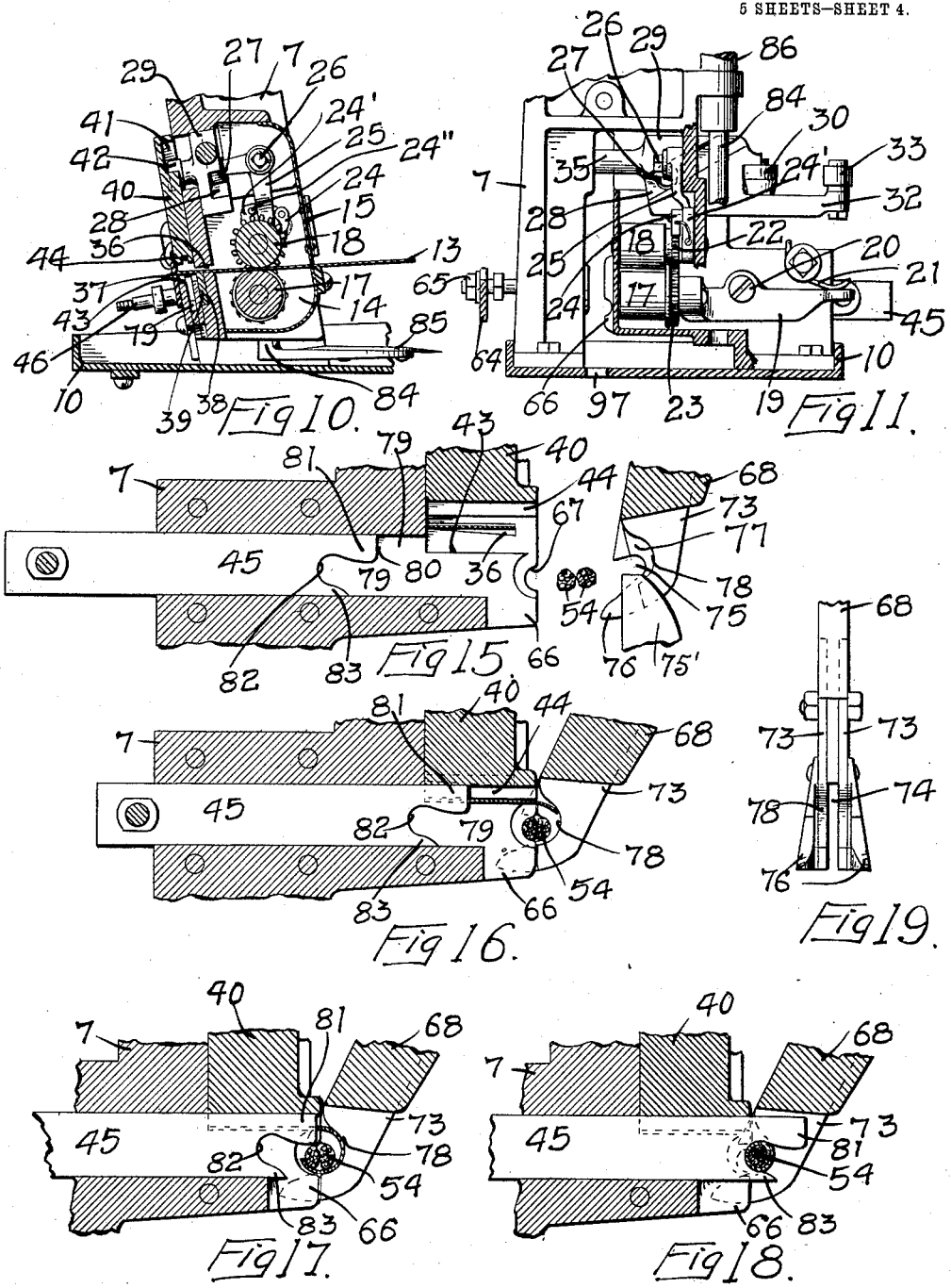

J. L. WARE.
BINDER HEAD FOR HARVESTERS.
APPLICATION FILED MAY 1, 1909.

1,039,853.

Patented Oct. 1, 1912.
5 SHEETS—SHEET 5.

WITNESSES
INVENTOR
JOSEPH L. WARE
BY
HIS ATTORNEYS

UNITED STATES PATENT OFFICE.

JOSEPH L. WARE, OF ST. PAUL, MINNESOTA, ASSIGNOR TO WARE GRAIN BINDER ATTACHMENT CO., OF MINNEAPOLIS, MINNESOTA, A CORPORATION OF SOUTH DAKOTA.

BINDER-HEAD FOR HARVESTERS.

1,039,853.  Specification of Letters Patent.  Patented Oct. 1, 1912.

Application filed May 1, 1909. Serial No. 493,325.

*To all whom it may concern:*

Be it known that I, JOSEPH L. WARE, of St. Paul, Ramsey county, Minnesota, have invented certain new and useful Improvements in Binder-Heads for Harvesters, of which the following is a specification.

My invention relates to means for securing the cord around a bundle of grain, taking the place of the well-known knotter mechanism provided for this purpose.

The object of my invention is to provide a securing means that is capable of working on a cord of varying size and one which cannot be successfully handled with an ordinary knotter head.

Various attempts have been made to utilize the twine made from flax fiber, but on account of its varying size, due generally to the formation of bunches or knots in the twine, it has been impracticable for use as a binder with an ordinary form of knotter.

My invention renders the use of flax fiber twine practicable and is designed for use with that kind of twine, but it may be used with ordinary binder twine if desired.

A further object is to provide a twine-securing means, which will be inexpensive and will securely hold the twine around the bundle without any danger of its becoming accidentally loosened.

A further object is to provide a binder head that is capable of application to any style and make of binder without change in its construction or re-adjustment of the parts. It is my purpose, however, to embody this invention in a complete reaping mechanism, though in view of the ready adaption of the device to any style of binder, it will not be necessary to buy a new machine, in order that the invention may be utilized.

A further object is to provide a twine-securing means, which will be positive in its action, springs and parts which might become weakened or broken being almost entirely eliminated.

My invention consists generally in means for feeding a metallic ribbon and means for cutting off a piece or clip from such ribbon.

Further, the invention consists in means for gripping the cord or twine.

Further, the invention consists in means for folding the clip around the crossed or contiguous portions of a cord and squeezing the clip thereon and cutting the cord to release the bundle.

Further the invention consists in means for clearing the throat in which the clamping operation is performed preparatory to placing the clamp on the cord.

Further, the invention consists in various constructions and combinations, all as hereinafter described and particularly pointed out in the claims.

Figure 21:
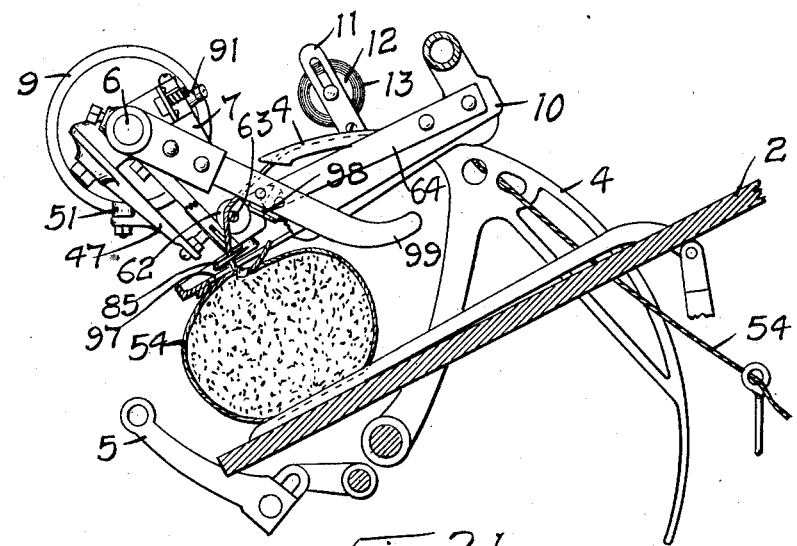

In the accompanying drawings, forming part of this specification, Figure 1 illustrates a vertical, sectional view through a binder with my invention applied thereto, Fig. 2 is a side view, partially in section, of the mechanism for forming the clasp and securing it around the cord, Fig. 3 is a front view, Fig. 4 is a sectional view taken at right angles substantially to Fig. 3, Fig. 5 is a view similar to Fig. 3, illustrating the parts of the mechanism in a different position, Fig. 6 is a view of the rear of the mechanism, Fig. 7 is a sectional view on the line X---X of Fig. 6, Fig. 8 is a detail view of the cord holder, Fig. 9 is a sectional view, illustrating one side of the cam disk, Fig. 10 is a sectional view, illustrating the manner of feeding the metallic ribbon to the knife, Fig. 11 is a view, illustrating the means employed for separating the feed rollers to remove the ribbon from between them, Figs. 12, 13 and 14 illustrate the manner of applying the metallic clip to the cord, which inclose the bundle, Figs. 15, 16, 17 and 18 illustrate the successive steps of the mechanism in cutting off the clip, bending or folding it around the cord and squeezing the ends of the clip together to grip the cord, Fig. 19 is a detail view of one of the jaws, between which the metallic clip is folded. Fig. 20 is a sectional view, illustrating the position assumed by the parts when the needle has carried the cord over the bundle preparatory to putting the clip or clamp thereon, Fig. 21 is a similar view, illustrating the knife in the act of cutting the cord while the needle is returned to its normal or retracted position, Fig. 22 is a sectional view, illustrating the successive positions of the knife.

In the drawing, 2 represents the deck of a binder, 3 one of the packers operating through the deck in the usual way, 4 the needle, the operation of which and the packer arms is controlled by a trip lever 5, operated through mechanism at the opposite side of the deck in the usual manner on machines of this type. 6 represents the drive shaft on which the knotter head usually employed with a binder is mounted.

An important feature of my invention lies in the fact that I am able to remove the knotter in use on a binder and substitute my apparatus in place thereof, without changing the construction of the binder. I am thus able to cheapen the application of my invention to a binder and very materially widen its field of usefulness.

The frame 7 of the binder head has a hub 8 that is adapted to slip on to the shaft 6 and on this frame, the clamp-forming and folding mechanism is mounted. A disk 9 is secured on the shaft 6 and is provided with cam surfaces, which I will hereinafter describe in detail.

Referring to Fig. 1, the frame 7 is illustrated as provided with a shelf 10 having standards 11 thereon, which carry a spool 12, on which the metallic ribbon 13 is wound. The ribbon is preferably of thin, annealed metal and pieces clipped therefrom are readily folded to form a clasp or binder. A chamber 14 (see Fig. 7) is provided on the frame 7 and has a door 15 beneath which is a slot 16, through which the end of the ribbon 13 is fed. Rollers 17 and 18 are provided near said slot in position to receive the end of the ribbon (see Figs. 7, 10 and 11). The lower roller 17 is carried by a lever 19 (see Fig. 11) that is pivoted at 20 and is engaged at one end by a spring 21, which tends to hold the opposite end of the lever and the roller 17 in engagement with the upper roller. By oscillating the lever 19, the operator can separate the ribbon feeding rolls and easily and quickly remove the ribbon from between them. The upper roller has teeth 22 meshing with similar teeth 23 on the lower roller and a dog 24 (see Figs. 7, 10 and 11) is arranged to engage the teeth 21 and revolve both rollers through the oscillation of a bell crank 25 that is pivoted at 26 and has an anti-friction roller 27 that is adapted to travel in a groove 28 (see Figs. 7 and 10). The groove 28 is provided in a plate 29 that is adapted to slide horizontally and is provided with an anti-friction roller 30, which engages a cam surface 31 on one side of the disk 8 and causes the movement of the plate 29 in one direction and said plate has an arm 32 (see Fig. 11) provided with an anti-friction roller 33, which engages a cam surface 34 on the opposite side of the disk and returns the plate to its normal position. The reciprocation of this plate takes place during the revolution of the disk and causes the operation of the feed rollers and the advancement of the metallic ribbon between them. One end of the plate 29 is provided with a guiding stud 35, fitting within a socket in the frame of the binder head. This construction provides for a positive movement of the plate 29 without depending upon springs for returning the parts to their normal position. When the revolution of the disk begins, the plate 29 must slide in one direction and as the movement of the disk continues, the plate must be returned to its starting point. The dog 24 is mounted on a plate 24' and one arm of the bell crank depends between this dog and a pin 24'', so that on the return stroke of the plate 29, the plate 24' will be oscillated and the dog moved back over the teeth of the roller to again revolve it when the bell crank is operated. The end of the ribbon is thrust through a slot 36 and contacts with a stop plate 37. The rollers are so adjusted that their travel will be sufficient to move the end of the ribbon into contact with the stop plate with each operation, thus insuring clips of the same size and taking up all lost motion.

The frame of the head has a recess 38 therein to receive a stationary knife 39, over which the metallic ribbon is fed. The movable knife 40 is arranged above the projecting end of the ribbon and has an obliquely arranged groove 41 therein, to receive an anti-friction roller 42 that is carried by the sliding plate 29. The movement of this plate therefore, causes the knife 40 to descend and coöperate with the stationary knife to sever a clip from the metallic ribbon. As soon as a clip is severed, it falls down upon a seat 43 (see Figs. 7 and 10). The lower edge of the knife has a groove 44 therein, which is adapted to receive the upper edge of a plunger 45 (see Figs. 15 and 18). This plunger has an adjustable connection 46 with a lever 47, which is pivoted at 48 and is provided with an arm 49 carrying rollers 50 and 51, between which the edge of the disk 9 is inserted, said rollers engaging respectively the cam surfaces 31 and 34, which, as the disk is revolved, causes the oscillation of the lever 47 and the reciprocation of the plunger forward and backward, both movements being positive and without depending upon springs or other similar devices.

When the knife 40 descends and severs the clip, it is held temporarily in its depressed position, bearing on the clip by the engagement of the roller 33 with a plate 33' that is secured to one side of the cam disk. This plate prevents premature movement of the knife blade during the initial movement of the clip endwise and until it has entered the curved portion of the movable jaw and is being bent around the cord. Unless some means is provided to bear on the clip and guide the same during its initial movement, it will be likely to bend or buckle and defeat the clamping operation. Flax fiber or other cord 54 is threaded through the needle in the usual way and passes up to a device, which I will designate as the cord holder, consisting of a disk 55 having a hub 56, which fits within a hub 57. An annular groove 58 is provided within the hub 56 to receive a screw 59. A spring-pressed pin 60 is slidable in the hub 57 and has a beveled end to engage the teeth 61 on the inner face of the disk 55. A disk 62 has a spindle 63 loosely fitting within the hub 56 and a flat spring 64 is secured to the frame of the binder head and adjustably attached to the spindle 63 by means of lock nuts 65. The disk 62 is therefore held against the face of the disk 55 with a yielding pressure (see Fig. 8). As the grain is packed on the platform, the cord will be drawn through the needle and swung from the position indicated in Fig. 1, to a point near the front of the deck and curved to follow the surface of the bundle. At the same time the cord holder will revolve, the hub 56 turning in its sleeve and the pin 60 sliding over the teeth of the ratchet. The end of the cord that is secured by the holder will therefore be allowed to follow the portion that is pressed forward by the grain and accommodate itself to the formation of the bundle. The ratchet device is for the purpose of preventing the disks from turning backward when the cord is engaged by the knife when the binding and clamping operation has been completed. This device will be of particular advantage when the knife is dull and any construction of holder, which would permit backward rotation might defeat the severing operation. At a predetermined point in the formation of the bundle of grain, the needle operates and carries the cord up around in the rear of the bundle in the usual way, delivering it across the free end of the cord, which is held between the clamping disks of the holder. The point where the needle delivers the cord is near the fixed jaw 66 provided with a gripping surface 67, substantially semi-circular in form (see Figs. 3, 15 and 16). A lever 68 is pivoted at 69 on the binder head frame and is provided at one end with an anti-friction roller 70 (see Fig. 5), which contacts with a cam surface 71, on the inner face of the disk 8. A spring 72 is arranged to hold the lever 68 in its withdrawn or retracted position. On the lower end of said lever and on each side thereof, plates 73 are secured having a space 74 between them (see Fig. 19). These plates have recesses 75 in their edges, which are adapted to receive the ends of the cord that is wrapped around a bundle and each plate has a long heel portion 76 forming the lower side of the recesses therein and serving to guide the ends of the cord into the recess and coöperate with the fixed jaw to retain the cords securely while the clip is being clamped thereon. A stripper plate 75' serves to separate the cord and clamps from the recess in the plates 73 upon their return movement. The rocking of the lever 68 through its engagement with the cam surface, moves the cords into position to receive the clamps and hold them firmly during the clamping operation. This is illustrated plainly in Figs. 15 to 18, in which the heel portions 76 are shown as lapping by the end of the fixed jaw on each side and closing the joint at the bottom between the fixed and movable jaws and preventing any escape of the cord at this point. The plates 73 are provided, as indicated in Fig. 15, with inclined surfaces 77, terminating in a curved rear wall 78, which engages the end of the clip and causes it to be bent around the cords. The stationary jaw 66 has a longitudinal slot 79 therein, in which the plunger 45 is slidable and the forward end of the plunger has a square face 80, which contacts with the end of the clip and forces it against the walls 77 and 78. At the time of engagement of the plunger with the clip, the upper edge of the plunger enters the groove 44 in the knife 40 and the plunger is guided and securely held against vertical or lateral movement (see Fig. 16). As the movement of the plunger continues, the clamp will be forced around following the curved walls of the fixed and movable jaws until it assumes the circular form illustrated in Fig. 17. At this point, the nose 81 of the plunger will reach a point just above the cords and the clip and will have nearly inclosed the cords and be in position for the last step of the clamping operation. This last step is accomplished by providing a recess 82 in the end of the plunger, substantially U-shaped in form and having a heel portion 83 with an inclined surface that is adapted to slip in under the cords and the forward end of the clamp and cause the said forward end to hug the cords and pass in under the rear end of the clip, which is still in contact with the end of the plunger, the effect being, as illustrated in Fig. 18, to cause the lapping by one another of the ends of the clip and the clamping of the cords securely.

Fig. 18 illustrates the final step of the clamp forming operation, the clip being shown folded around the cords and firmly gripping them. One end of the cord is gripped between the disks of the cord holder, which is free to turn in its bearings as the packers force the grain against the cord and toward the front of the deck until the bundle and the cord will assume the position indicated in Fig. 20, in which the holder is shown revolved to a point where the cord will be on the under side thereof, and when the needle comes up, it will lay the other end of the cord across the end that is gripped by the holder, as indicated in Figs. 12, 13 and 20, where the cord will be in position to receive the clamp. Previous to the movement of the needle however, the severing knife has been actuated and set in position to perform the cutting of the cord at a predetermined point in the operation of the machine. This severing device consists of a vertical shaft 84, on the lower end of which is mounted a horizontal arm, carrying a sickle-shaped knife 85, see Fig. 4. The shaft 84 is rotated and the knife swung in a horizontal plane through the throat below the clamp-forming mechanism for the purpose of clearing away any grain or foreign material, which may have lodged in the slot 97, and would interfere with the operation of placing the clamp on the cord. The movement of the shaft is effected by means of an arm 92, having an anti-friction roller 93 thereon, which contacts with a cam surface 94 on the disk 9. By the engagement of the anti-friction roller 93 with the cam surface, the knife blade is swung to the position indicated in Fig. 20, where it will engage and draw taut the end of the cord that is gripped by the holder and will also support the other end of the cord that is brought up by the needle and laid over the cord in the holder in the manner indicated in Figs. 12 and 13. The blade of the knife in this position will prevent the cord from sagging and will insure its engagement by the heel portion 76 of the movable jaw, so that the entrance of the cord into the recess in the jaw will be assured. During the time the horizontal arm of the severing device is supporting the cord and guiding it into the clamping jaws, it is locked against movement in either direction by means of an arm 95, which enters a guide way 95′ in the cam 9 (see Fig. 9). After leaving this guideway, the arm 95 engages a cam surface 96, which causes the shaft 84 to be rocked still farther and throws the knife blade out to the position indicated by the lower dotted lines in Fig. 22, the upper lines representing the position of the knife blade during its stationary period and when it is supporting the cords during the clamping operation. The further backward movement of the knife swings it to a position from between the ends of the cord and the clamp having been formed and squeezed around the ends of the cord, the plate 98 contacts with the anti-friction roller 100 on the plate 64, pushes the spindle of the cord holder inwardly and releases the end of the cord and the cord holder being open, the needle on its return stroke will lay the cord therein, as indicated in Fig. 21, and the knife blade will then start forward to perform the severing operation. This movement of the knife to cut the cord is effected by means of a hub 86 on the shaft 84, having a series of teeth 87 meshing with the teeth 88 on a sliding bar 89. An anti-friction roller 90 is mounted on one end of said bar in position to contact with a cam surface 91 at a predetermined point in the operation of the machine, or when the needle is on its return stroke and has deposited the cord in the holder and has drawn taut, as indicated in Fig. 21, so that the knife can perform its operation. At this time, the plate 98 and arm 99 will have passed the cord holder and the holder will close, gripping the end of the cord held by the needle, so that as the needle returns to its normal position beneath the deck of the binder, a fresh supply of cord will be drawn from the reel, ready to receive the grain to form a new bundle. The rotation of the cord holder, under the pressure of the grain on the cord, from the position shown in Fig. 21 to that shown in Fig. 20, has already been referred to.

I have shown this invention applied to a grain harvesting apparatus but it may be used for binding bundles of corn, hay, or other articles, that are put up in bales or bundles.

I have described this binder head as adapted particularly for handling twine of the so-called grass type, but it may also be used with the ordinary binder twine or with a wire binder, if preferred.

I claim as my invention:—

1. The combination, with a deck, of a cord holder adapted to grip one end of a cord, means for packing the material on said deck against said cord, a needle arranged to bring up the loose end of the cord around the bundle and lay it across that portion of the cord gripped by said holder, means for passing a flexible clip around the crossed portions of the cord and clamping it thereon, means for temporarily opening the holder to release that portion of the cord gripped thereby, the needle on its return movement laying the loose end of the cord in the open holder to be gripped thereby upon the closing of said holder, and means for severing the cord between the needle and the bundle.

2. The combination, with a binder deck, of a cord holder, adapted to grip one end of the cord and capable of movement to allow the cord to travel from a point above the holder to a point beneath the same, means for packing the grain on said deck against the cord, a needle arranged to bring up the free portion of the cord and lay it across the end near said holder, and means for folding a flexible clip around said crossed portions of the cord and clamping it thereon.

3. The combination, with a deck, of a rotary cord holder comprising disks having clamping faces between which one end of the cord is gripped and held, means for packing the grain against the cord, a needle arranged to bring up the free portion of the cord and lay it across the end that is near said holder, and means for placing a clamp on the crossed portions of the cord, substantially as described.

4. The combination, with a deck, of a cord holder adapted to grip one end of the cord, means for packing the grain against the cord, a needle arranged to bring up the cord around the bundle, and lay it across the part near said holder, means for placing the clamp around the crossed portions of the cord, means for opening the holder and releasing the end of the cord gripped thereby, the needle on its return stroke laying its end of the cord in the holder to be gripped therein and means for severing the cord between the holder and the bundle.

5. In a binder head, a cord holder, means for bringing together the portions of the cord to be clamped, jaws between which the clamp is formed, a throat being provided contiguous to said jaws and holder and in which the portions of the cord to be secured together lie, and a severing knife arranged to clear said throat preliminary to the clamping operation.

6. In a binder head, a cord holder, means for bringing together the portions of the cord to be clamped, jaws between which the binder is clamped, a throat being provided contiguous to said jaws and holder, a horizontal knife blade, and means for oscillating said knife blade to clear the throat preparatory to the clamping operation.

7. In a binder head, a cord holder, means for bringing together the portions of the cord to be clamped, jaws between which a flexible clip is formed, a severing knife operating contiguous to said jaws to sever the cord, the movement of said knife being temporarily arrested beneath said jaws and serving as a support for the contiguous portions of the cord during the placing of the clamp thereon.

8. In a binder head, a cord holder, means for bringing together the portions of the cord to be clamped, means for forming and squeezing a clip around the said portions of the cord, a severing knife operating horizontally and having a vertical axis, and means for operating said knife, said knife, preliminary to the severing operation, serving as a support for the portions of the cord to be clamped together, substantially as described.

9. In a binder head, a cord holder, means for bringing together the portions of the cord to be clamped, means for clamping a clip around the two portions of the cord, a severing knife arranged to support said portions of the cord during the operation of placing the clamp thereon, and means for locking said severing knife against premature movement during the clamp forming operation.

10. In a binder head, a cord holder, means for bringing together the portions of the cord to be clamped, means for forming a clamp around the said portions of the cord, a severing knife adapted to support the said portions of the cord during the clamp forming operation, means including a cam disk having a guide way and an arm connected with said knife and movable in said guide way for locking said knife temporarily during the clamp forming operation.

11. In a binder head, a cord holder, comprising two rotatable disks, means for normally holding them in yielding engagement with one another, one of said disks being capable of movement away from the other disk, to allow the release of the cord held between them, and the rotation of said disks allowing the cord to be moved from a position at the top of the disks to a point below them.

12. The combination, with a deck, of a cord holder adapted to grip one end of a cord, means for packing the material against the cord, a needle arranged to pass the cord around the bundle and deposit it close to that portion of the cord held by said holder, means for folding a clip around the contiguous portions of the cord and squeezing it thereon, means for temporarily opening the holder to release that portion of the cord gripped thereby, the needle on its return movement laying the loose end of the cord in the holder so opened, and means for severing the cord between the needle and bundle.

13. The combination, with a binder deck, of a cord holder, means for packing the grain against the cord, a needle arranged to bring up the cord and lay it across the end portion held by said holder, a ribbon feeding device comprising upper and lower rollers between which the end of the ribbon is inserted, means for feeding the ribbon step by step, a stop device with which the end of the ribbon contacts with each feeding operation, means for severing a clip from the ribbon and means for forming a clamp around the contiguous portions of the cord.

14. The combination, with a binder deck, of a cord holder, means for packing the grain against the cord, a needle arranged to bring up the cord and lay it across the end portion held by said holder, means for feeding a flexible ribbon comprising upper and lower feed rolls and means for operating them, one of said rolls being capable of independent movement to allow its separation from the other roll and the removal of the ribbon from between them, a stop device in the path of the ribbon and with which the ribbon contacts with each step of its operation, means for severing a clip from the ribbon, and means for forming the clip into a clamp around the contiguous portions of the cord.

15. The combination, with a binder deck, of a cord holder adapted to grip one end of a cord, means for packing the grain against the cord, a needle arranged to bring up the cord around the bundle and deliver it contiguous to that portion gripped by said holder, means for gripping the contiguous portions of the cord, means for feeding a flexible clip around said gripped portions, said feeding means including a plunger having a forward face adapted to engage the end of the clip, and a forked portion in the rear of said face having curved walls that are adapted to embrace the cord and clip and clamp the clip thereon.

16. In a deck, a cord holder, means for packing the material to be bound against the cord, a needle arranged to pass a cord around the bundle and deposit it near that portion held by said holder, means for severing and feeding a flexible clip, a former adapted to grasp the contiguous portions of the cord, said former including a stationary and a movable jaw having curved faces with which the forward end of the clip contacts to direct it around the contiguous portions of the cord, and means having a curved surface to straddle the clip during the final step of the clamp forming operation and squeeze it on the cord.

17. The combination, with a binder deck, of a cord holder, means for packing the grain against the cord, a needle arranged to bring up the cord around the bundle and place it close to that portion held by said holder, a severing means including a reciprocating knife having a grooved end, means for feeding a ribbon to said knife, a seat whereon said clip is held by the pressure of said knife, means for holding said knife temporarily in engagement with the severed clip, means operating in the groove in said knife and engaging said clip to move it lengthwise and means for forming a clip around the contiguous portions of the cord.

18. The combination, with a binder deck, of a cord holder, means for packing the grain against the cord, a needle, arranged to place the cord around the bundle and deposit it close to that portion of the cord held by said holder, a clamp forming mechanism comprising means for severing a flexible clip, means for feeding said clip lengthwise, means for folding and clamping said clip around the contiguous portions of the bundle cord, said means including a plunger having a part to engage the end of the clip to perform the initial folding around the portions of the cord, and said plunger having a recess, the walls of which engage the partially folded clip and complete the folding operation.

19. The combination, with a binder deck, of a cord holder, means for packing the grain against the cord, a needle, arranged to pass the cord around the bundle and deposit it near that portion held by said holder, means for feeding a flexible ribbon, a severing knife therefor, means for feeding the clip lengthwise, means for locking said knife in engagement with said clip during its lengthwise movement, said locking means including a cam guide, and a shaft connected with said severing knife and having an arm movable in said guide, and means for forming the clip around the contiguous portions of the cord.

20. The combination, with a binder deck, of a cord holder, means for packing the grain against the cord, a needle arranged to pass the cord around the bundle and deposit it near that portion held by said holder, a clamp forming mechanism comprising a severing knife having a groove, a plunger arranged to enter said groove and engage the clip severed by said knife and move the same endwise, said knife contacting with said clip during its initial lengthwise movement and preventing bending or buckling thereof, and means for forming the clip around the contiguous portions of the cord.

21. A binder deck, a cord holder, means for packing the grain against the cord, and a needle, arranged to pass a cord around the bundle and deposit it near that portion held by said holder, in combination with a clip severing mechanism and means for feeding the clip, and former jaws between which the clip is forced endwise, said jaws operating to bend the clip around the contiguous portions of the bundle cord and including a part having a recess, the walls of which engage said clip during the final steps of the bending operation.

22. A binder deck, a cord holder, means for packing the grain against the cord, and a needle, arranged to pass the cord around the bundle and deposit it near that portion held by said holder, in combination with means for severing and feeding a flexible clip, and a former adapted to grasp the cord, said former including a stationary and a movable jaw having grooved surfaces with which the forward end of the clip contacts to direct and curve it around the contiguous portions of the cord, said jaws also including a part having a recess with curved walls to engage the clip during the final steps of the forming operation.

23. A binder deck, a cord holder, means for packing the grain against the cord, and a needle, arranged to pass the cord around the bundle and deliver it close to that portion held by said holder, in combination with a clamp former comprising jaws between which the contiguous portions of the cord are gripped and held, said jaws having curved faces, and means for feeding a flexible clip into contact with said faces and forcing it around said portions of the cord, said feeding means having a part to direct one end of the clip under the other end and complete the clamp forming operation.

24. A binder deck, a cord holder, means for packing the grain against the cord, and a needle arranged to pass the cord around the bundle and deliver it close to that portion held by said holder, in combination with a clamp former comprising jaws between which the cords are gripped and held, said jaws having recessed faces formed therein, one of said jaws having a projecting part that is adapted to slip under the cord and support it in the path of the clamp, said jaws contacting with one another and gripping the contiguous portions of the cord between them and having a curved guide way to receive the clamp, said guide way extending around the cord portions as they are held between the jaws, and means having a recess provided with curved walls for feeding the clamp in said guide way.

25. A binder deck, a cord holder, means for packing the grain against the cord, and a needle arranged to pass the cord around the bundle and deliver it close to that portion held by said holder, in combination with a clamp former comprising a stationary jaw having a recess therein provided with curved walls, a movable jaw having plates secured thereto with a space between them, said plates and said jaw being recessed and the contiguous portions of the cord being gripped and held between said fixed and movable jaws, said movable jaw having a curved face between said plates, a plunger having a recessed forward end for moving a clamp into contact with said face and said face directing the clamp around the cord portions.

26. A binder deck, a cord holder, means for packing the grain against the cord, a needle arranged to pass the cord around the bundle and deposit it close to that portion held by said holder, in combination with clamping jaws between which the cord is gripped and held, said jaws having curved recesses therein extending around the contiguous portions of the cord, a plunger operating to feed a flexible clamp to said jaws and into the passage extending around the cord portions, said plunger having a recessed end and a wall therein whereby one end of the clamp will be forced in under the other end to complete the clamping operation.

27. A binder deck, a cord holder, means for packing the grain against the cord, a needle arranged to pass the cord around the bundle and deposit it close to that portion held by said holder, in combination, with jaws adapted to grip the portions of the cord and having curved faces and means for feeding a flexible clip around the portions of the cord held by said jaws, said feeding means having a part to engage the clip after the initial folding thereof and lap its ends by one another.

28. A binder deck, a cord holder, means for packing grain against the cord, a needle arranged to pass the cord around the bundle and deposit it close to that portion held by said holder, in combination with jaws having curved faces between which the cord is held, means for feeding a clip endwise into said jaws and around the contiguous portions of said cord, said means having a substantially U-shaped recess therein the wall of which engages the clip in the final step of the clamping operation.

29. A binder deck, a cord holder, means for packing grain against the cord, a needle arranged to pass the cord around the bundle and deposit it close to that portion held by said holder, in combination with jaws between which the contiguous portions of the cord are gripped, a plunger operating to feed a clip endwise into said jaws and around said portions of the cord, said plunger having a heel portion to pass beneath said cord and a recess to receive the partially folded clip and complete the clamping operation.

30. A binder deck, a cord holder, means for packing grain against the cord, a needle arranged to pass the cord around the bundle and deposit it close to that portion held by the cord holder, in combination with jaws between which the contiguous portions of the cord are gripped, a severing knife having a groove therein, a plunger having an edge to enter and slide in said groove, said plunger having a part to engage a clip and feed it endwise into said jaws and around said portions of the cord therein, said plunger having a part to engage said clip after the initial folding thereof, and lap its ends past one another around said cord portions.

31. In a binder head, a cord holder, means for bringing together the two portions of the cord to be clamped, means for gripping the said portions of the cord, means for bending a flexible clip around said gripped portions of the cord, said means having a part to straddle said cord and clip and squeeze the clip on the cord in the final step of the clamping operation.

32. In a binder head, a cord holder, means for bringing together the portions of the cord to be clamped, means for severing and bending a flexible clip around the contiguous portions of the cord, a plunger having a recess therein adapted to receive the partially folded clamp, the walls of said recess engaging the clamp and squeezing it around said cord portions with one end of the clamp lapping by its other end.

33. In a binder head, a cord holder, means for bringing together the portions of the cord to be clamped, a clamp forming means, said head having a throat contiguous to said clamp forming means in which throat the contiguous portions of the cord lie, and means arranged to sweep through said throat and clear the same preliminary to the clamping operation.

34. In a binder head, a cord holder, means for bringing together the portions of the cord to be clamped, means for forming a binder around the contiguous portions of the cord, a throat being provided contiguous to said holder, a horizontal knife blade having an upright axis, and means operatively connected with said axis for rotating the same and oscillating said knife blade.

35. In a binder head, a cord holder, means for bringing together the portions of the cord to be clamped, jaws between which a flexible clip is formed around contiguous portions of the cord, a severing knife having an upright axis and operating arms mounted thereon, means engaging said operating arms to rotate said axis and operate said knife, said operating means allowing the movement of said knife to be temporarily arrested at a predetermined point in its stroke, and said knife supporting said cord portions during the formation of the clip around them.

36. In a binder head, a cord holder, means for bringing a cord around the bundle and delivering it close to that portion gripped by said holder, means for gripping the contiguous portions of the cord, and means for placing a clip on said gripped portions, said means having a part to straddle the cord and squeeze the clip thereon.

37. In a binder head, a cord holder, means for bringing together the portions of the cord to be clasped, clamp forming means, said head having a throat contiguous to said clamp forming means, in which throat the contiguous portions of the cord lie, means supporting said portions of the cord in said throat preliminary to the clamping operation and means for separating the clamp and cord from said clamp forming means.

In witness whereof, I have hereunto set my hand this 14th day of April 1909.

JOSEPH L. WARE.

Witnesses:
 JESSIE M. SULLIVAN,
 RICHARD PAUL.

Copies of this patent may be obtained for five cents each, by addressing the "Commissioner of Patents, Washington, D. C."